(12) United States Patent
Kimura

(10) Patent No.: US 10,764,468 B2
(45) Date of Patent: Sep. 1, 2020

(54) IMAGE PROCESSING APPARATUS AND IMAGE PROCESSING METHOD

(71) Applicant: CANON KABUSHIKI KAISHA, Tokyo (JP)

(72) Inventor: Naoto Kimura, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 99 days.

(21) Appl. No.: 16/040,221

(22) Filed: Jul. 19, 2018

(65) Prior Publication Data
US 2019/0037102 A1  Jan. 31, 2019

(30) Foreign Application Priority Data

Jul. 26, 2017  (JP) ................. 2017-144401

(51) Int. Cl.
| H04N 5/243 | (2006.01) |
| H04N 1/407 | (2006.01) |
| H04N 1/393 | (2006.01) |
| G06T 5/00  | (2006.01) |

(52) U.S. Cl.
CPC ........... *H04N 1/4074* (2013.01); *G06T 5/009* (2013.01); *H04N 1/393* (2013.01); *H04N 1/407* (2013.01)

(58) Field of Classification Search
CPC .................................................... H04N 5/243
See application file for complete search history.

(56) References Cited

U.S. PATENT DOCUMENTS

| 9,749,506 | B2* | 8/2017 | Matsumoto | H04N 5/2176 |
| 2006/0062562 | A1* | 3/2006 | Utagawa | G06T 5/008 |
| | | | | 396/213 |
| 2007/0115369 | A1* | 5/2007 | Utagawa | H04N 9/045 |
| | | | | 348/222.1 |
| 2008/0093545 | A1* | 4/2008 | Manak | A61B 6/583 |
| | | | | 250/252.1 |
| 2009/0109233 | A1* | 4/2009 | Kerofsky | G09G 3/2003 |
| | | | | 345/589 |
| 2010/0290714 | A1* | 11/2010 | Toyoda | G06T 5/009 |
| | | | | 382/264 |
| 2011/0164888 | A1* | 7/2011 | Kubo | G03G 15/0266 |
| | | | | 399/27 |
| 2012/0134574 | A1* | 5/2012 | Takahashi | G06T 5/009 |
| | | | | 382/154 |
| 2014/0044232 | A1* | 2/2014 | Liu | H04N 5/32 |
| | | | | 378/62 |
| 2014/0079333 | A1* | 3/2014 | Hirai | H04N 5/23235 |
| | | | | 382/255 |

(Continued)

FOREIGN PATENT DOCUMENTS

JP  2004-221644 A  8/2004

*Primary Examiner* — Cindy Trandai
(74) *Attorney, Agent, or Firm* — Canon U.S.A., Inc. IP Division

(57) ABSTRACT

An apparatus includes an image generation unit configured to generate, from an input image, a hierarchical image including a plurality of images different in frequency band from one another, a first gain map generation unit configured to generate a first gain map with use of the hierarchical image and a first tone characteristic, a second gain map generation unit configured to generate a second gain map with use of the first gain map and a second tone characteristic, and a processing unit configured to apply the second gain map to the input image.

6 Claims, 18 Drawing Sheets

(56) References Cited

U.S. PATENT DOCUMENTS

| | | | |
|---|---|---|---|
| 2014/0119650 A1* | 5/2014 | Zhou | H04N 1/6027 |
| | | | 382/167 |
| 2016/0217552 A1* | 7/2016 | Yang | G06K 9/6218 |
| 2016/0269707 A1* | 9/2016 | Yoshizaki | H04N 9/735 |
| 2016/0371823 A1* | 12/2016 | Kimura | G06T 5/008 |
| 2017/0006272 A1* | 1/2017 | Ioka | H04N 1/6027 |
| 2017/0301069 A1* | 10/2017 | Sato | G02B 23/24 |
| 2017/0372675 A1* | 12/2017 | Cho | G09G 5/006 |
| 2018/0115758 A1* | 4/2018 | Kimura | H04N 1/4072 |
| 2018/0309944 A1* | 10/2018 | Lee | G09G 5/363 |

* cited by examiner

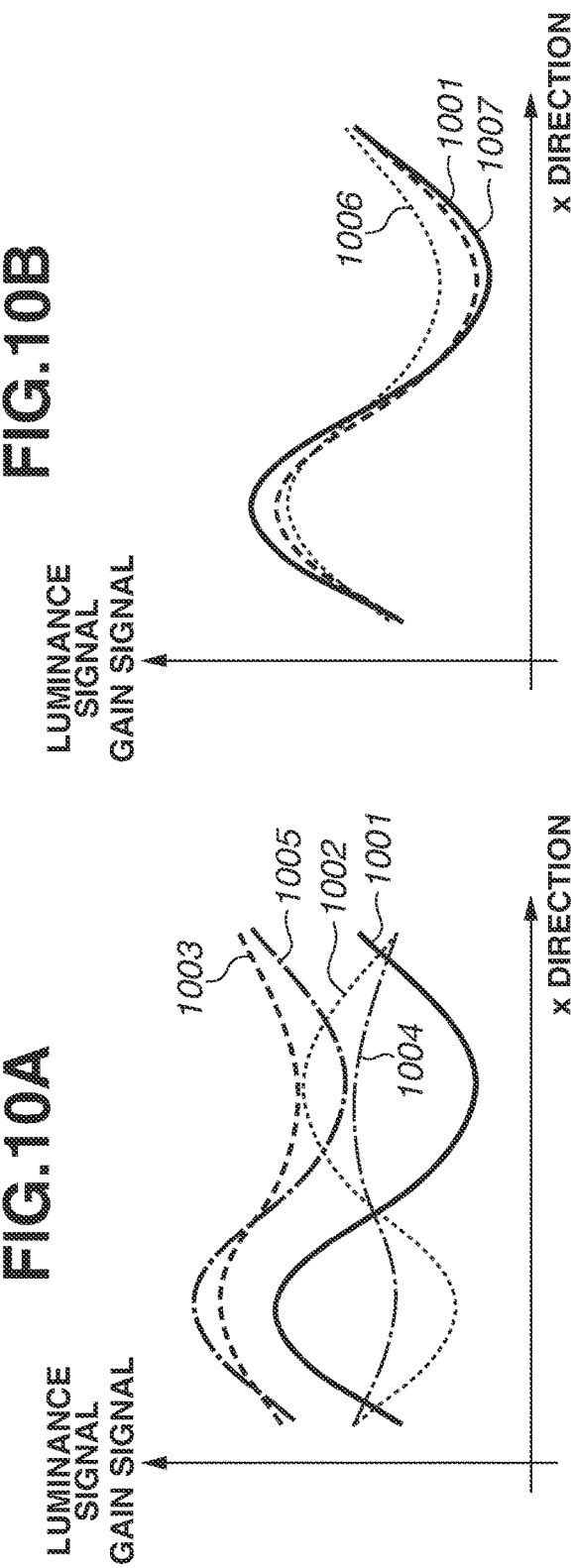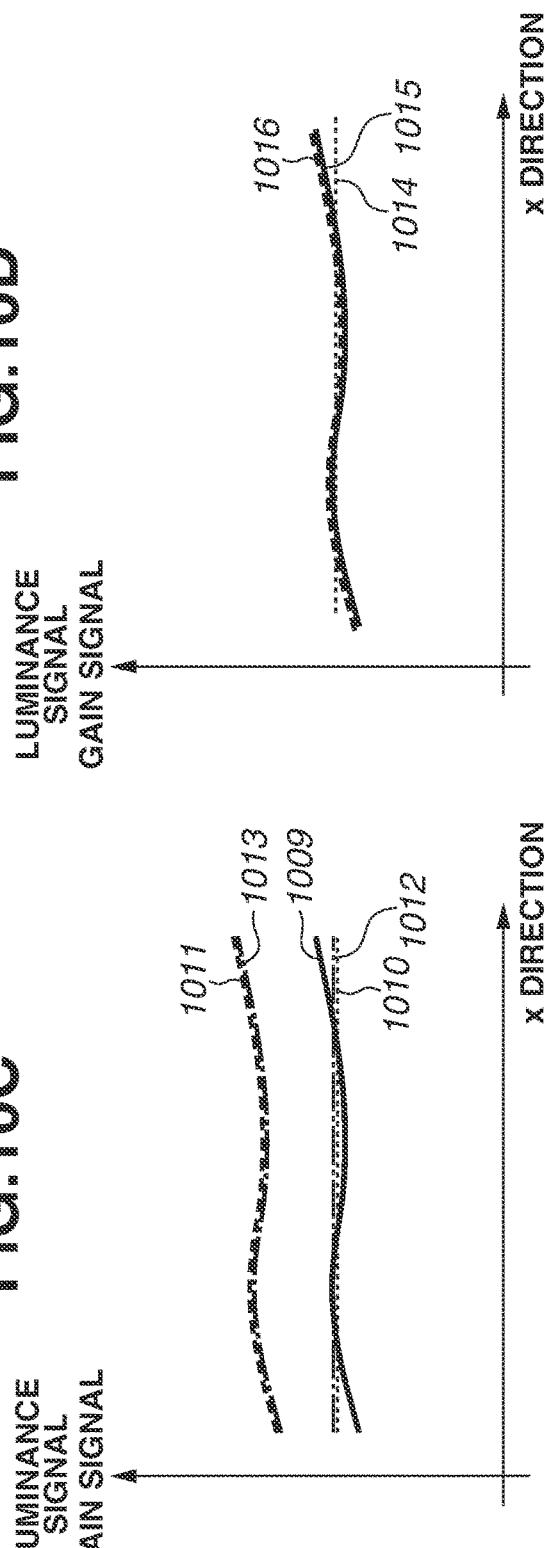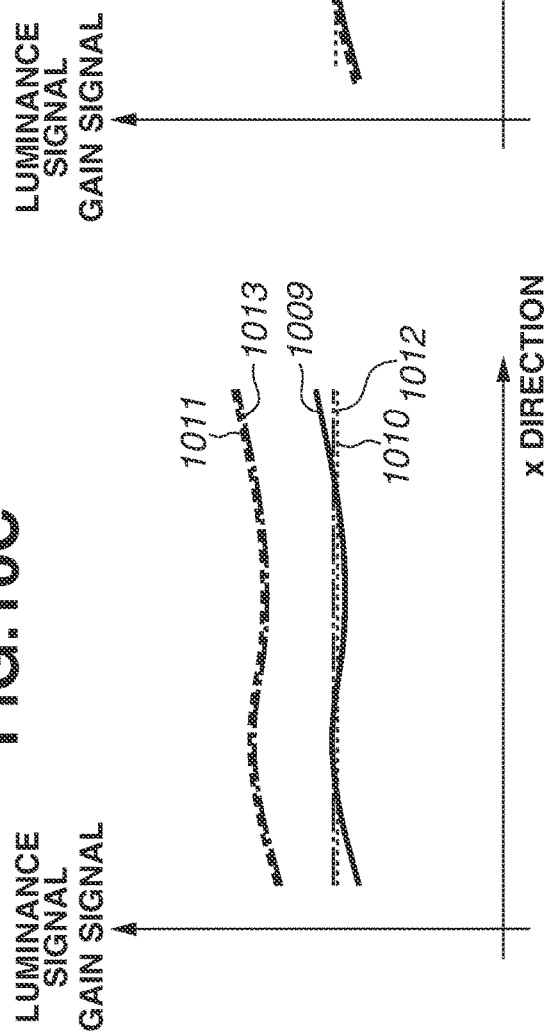

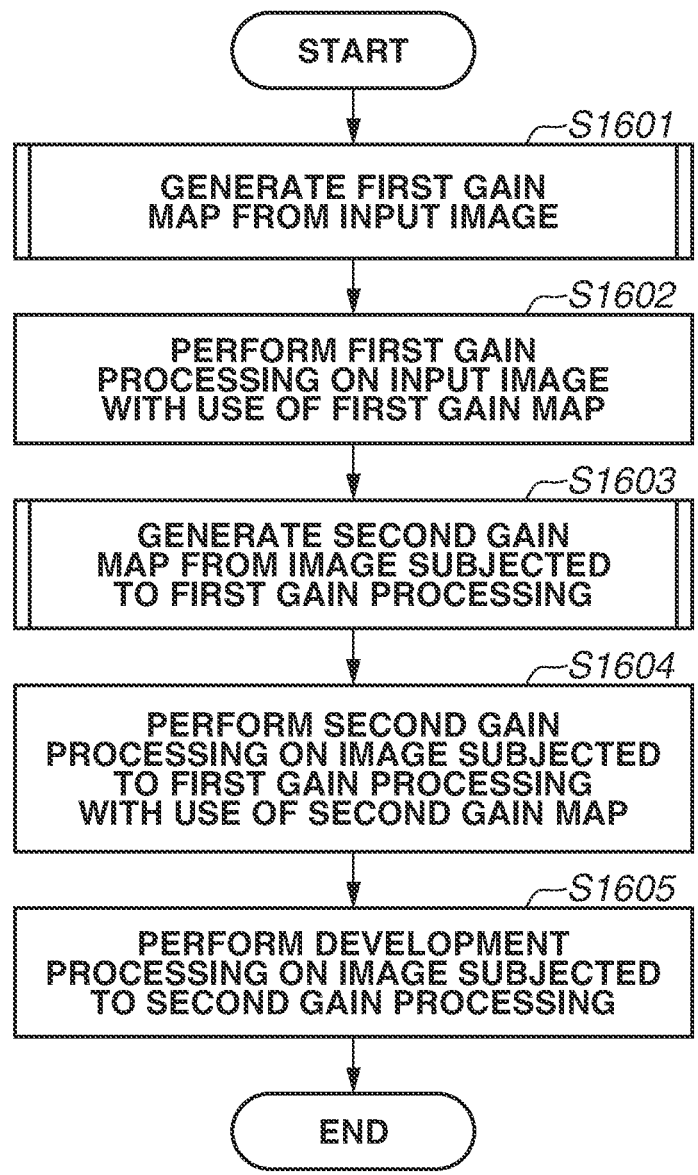

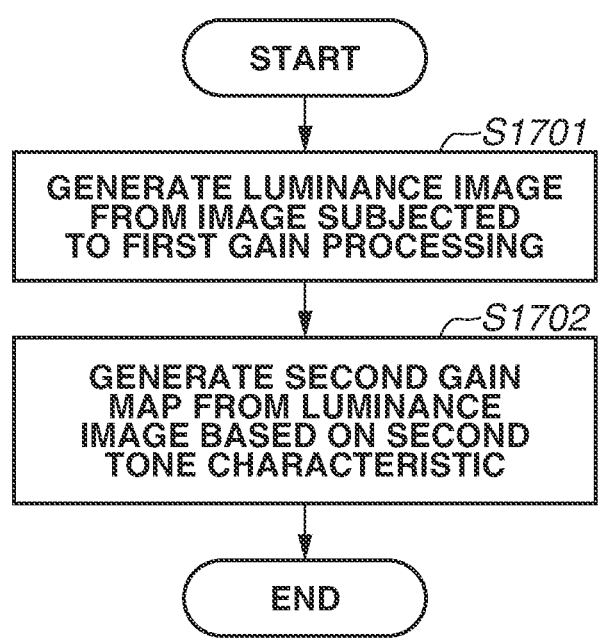

IMAGE PROCESSING APPARATUS AND IMAGE PROCESSING METHOD

BACKGROUND OF THE INVENTION

Field of the Invention

The aspect of the embodiments relates to tone processing of an image.

Description of the Related Art

In an existing image tone processing technique, a luminance signal of an image is converted based on an S-curve conversion characteristic as illustrated in FIG. 18A to improve contrast of the image.

When the above-described S-curve is applied, however, low luminance is converted into lower luminance and high luminance is converted into higher luminance as illustrated in a luminance histogram of FIG. 18B. Therefore, there is an issue that brightness in a low-frequency region not requiring improvement of contrast such as a region of sky or shady concrete is largely changed.

To solve such an issue, for example, Japanese Patent Application Laid-Open No. 2004-221644 discusses a technique in which an image to which a compression tone curve has been applied is reduced and enlarged to generate a smoothed image, and based a luminance value of the smoothed image and on a gain value obtained by inverting the tone curve, a compression correction is performed again on the image to which the compression tone curve has been applied.

SUMMARY OF THE INVENTION

According to an aspect of the embodiments, an apparatus includes an image generation unit configured to generate, from an input image, a hierarchical image including a plurality of images different in frequency band from one another, a first gain map generation unit configured to generate a first gain map with use of the hierarchical image and a first tone characteristic, a second gain map generation unit configured to generate a second gain map with use of the first gain map and a second tone characteristic, and a processing unit configured to apply the second gain map to the input image.

Further features of the disclosure will become apparent from the following description of exemplary embodiments with reference to the attached drawings.

BRIEF DESCRIPTION OF THE DRAWINGS

FIGS. 10A to 10D are graphs illustrating a contrast improvement effect of an image according to the first exemplary embodiment.

FIG. 16 is a flowchart illustrating processing by the image processing unit according to the third exemplary embodiment.

FIG. 17 is a flowchart illustrating processing by the second gain map generation unit according to the third exemplary embodiment.

DESCRIPTION OF THE EMBODIMENTS

Figure 1:
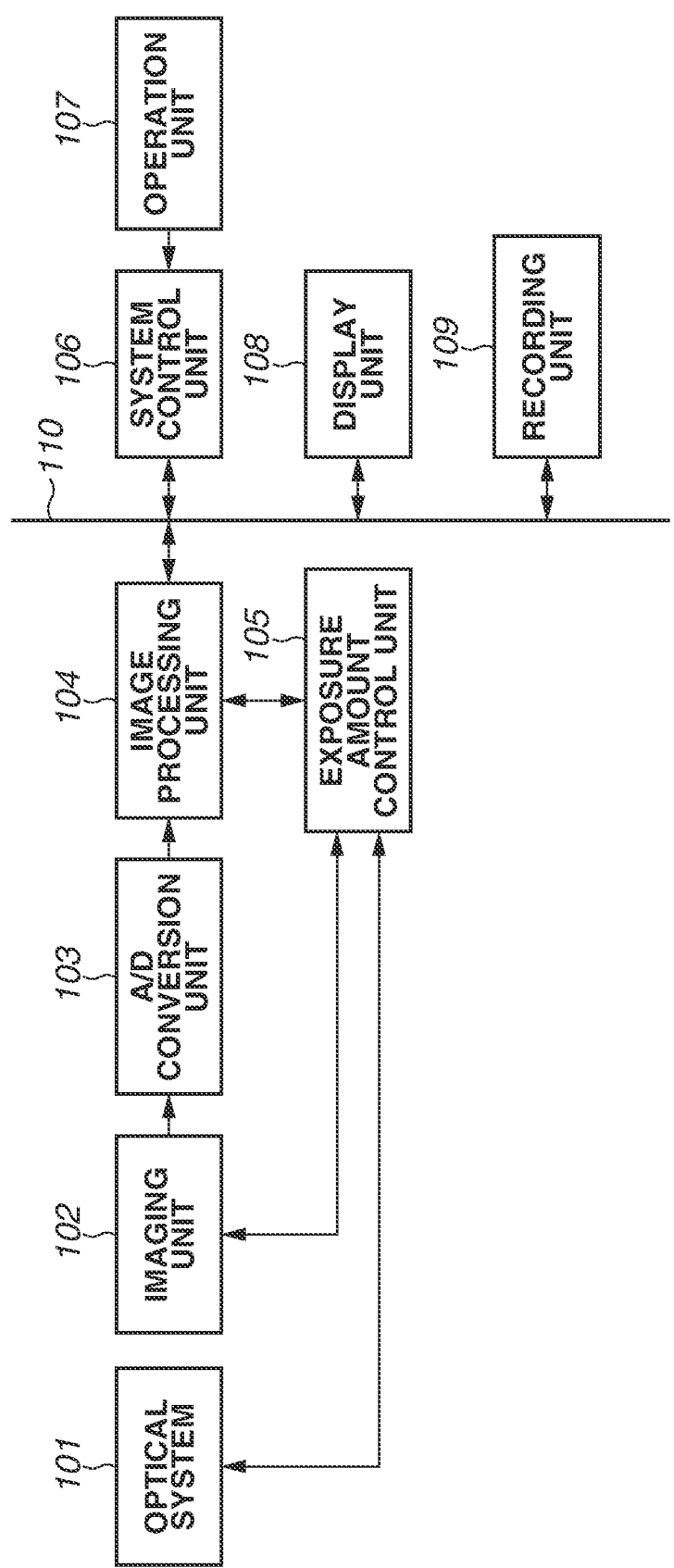
FIG. 1 is a block diagram illustrating a configuration applicable to an image processing apparatus according to a first exemplary embodiment of the disclosure.

Elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EPROM). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine accessible medium. The "processor readable or accessible medium" or "machine readable or accessible medium" may include any medium that may store information. Examples of the processor readable or machine accessible medium that may store include a storage medium, an electronic circuit, a semiconductor memory device, a read only memory (ROM), a flash memory, a Universal Serial Bus (USB) memory stick, an erasable programmable ROM (EPROM), a floppy diskette, a compact disk (CD) ROM, an optical disk, a hard disk, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein. The program code may include machine readable code, instruction or instructions to perform the operations or actions described above. The term "information" or "data" here refers to any type of information that is encoded for machine-readable purposes. Therefore, it may include program, code, data, file, etc.

All or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

Exemplary embodiments of the disclosure are described in detail below with reference to accompanying drawings. The exemplary embodiments in which the disclosure is applied to a digital camera as an imaging apparatus are described. However, the disclosure is not limited to the digital camera and is applicable to other image processing apparatus.

A first exemplary embodiment of the disclosure is characterized in that a second tone characteristic that cancels a luminance change by a first tone characteristic is applied to a first gain map, which is generated from a reduced image of an input image and the first tone characteristic, to generate a second gain map, and gain processing is performed on the input image with use of the second gain map.

FIG. 1 is a block diagram illustrating a configuration applicable to an imaging apparatus according to the present exemplary embodiment. Components of the imaging apparatus are described with reference to FIG. 1.

An optical system 101 includes a lens group including a zoom lens and a focus lens, a diaphragm adjustment device, and a shutter device. The optical system 101 adjusts a magnification, a focus state, and a light quantity of an object image formed on an imaging unit 102. The imaging unit 102 is a photoelectric conversion device, such as a charge-coupled device (CCD) sensor and a complementary metal-oxide semiconductor (CMOS) sensor, that photoelectrically converts a light flux of an object that has passed through the optical system 101 into an electric signal.

An analog/digital (A/D) conversion unit 103 converts an input image signal into a digital image signal.

An image processing unit 104 performs exposure amount calculation processing and tone processing in addition to normal signal processing. The image processing unit 104 can perform similar image processing on an image read from a recording unit 109 in addition to the image provided from the A/D conversion unit 103.

An exposure amount control unit 105 controls the optical system 101 and the imaging unit 102 to control a diaphragm, a shutter speed, and an analog gain of a sensor to achieve an exposure amount calculated by the image processing unit 104.

A system control unit 106 is a control function unit that controls overall operations of the entire apparatus. The system control unit 106 also performs driving control of the optical system 101 and the imaging unit 102 based on a luminance value obtained from the image processed by the image processing unit 104 and an instruction transmitted from an operation unit 107.

A display unit 108 includes a liquid crystal display or an organic electroluminescence (EL) display, and displays an image generated by the imaging unit 102 and an image read from the recording unit 109. The recording unit 109 has a function of recording an image. For example, the recording unit 109 may include an information recording medium such as a memory card including a semiconductor memory or a unit including a rotary recording medium such as a magneto-optical disk, and the information recording medium may be configured to be attachable to and detachable from the recording unit 109.

A bus 110 is used for exchanging an image between the image processing unit 104, the system control unit 106, the display unit 108, and the recording unit 109.

Next, processing performed in the image processing unit 104 is described.

Figure 2:
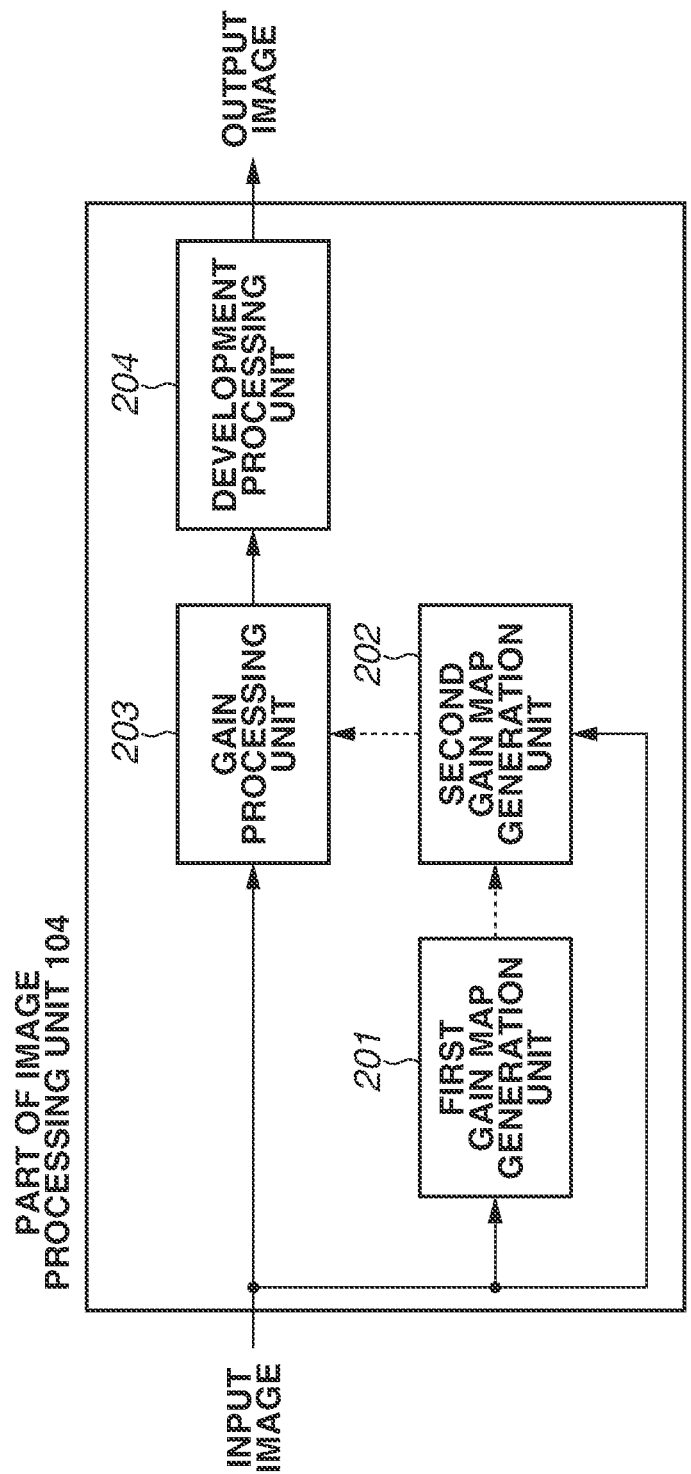
FIG. 2 is a block diagram illustrating a configuration of an image processing unit according to the first exemplary embodiment.

FIG. 2 is a block diagram illustrating a configuration in the image processing unit 104. The image processing unit 104 includes a first gain map generation unit 201, a second gain map generation unit 202, a gain processing unit 203, and a development processing unit 204.

Figure 5:
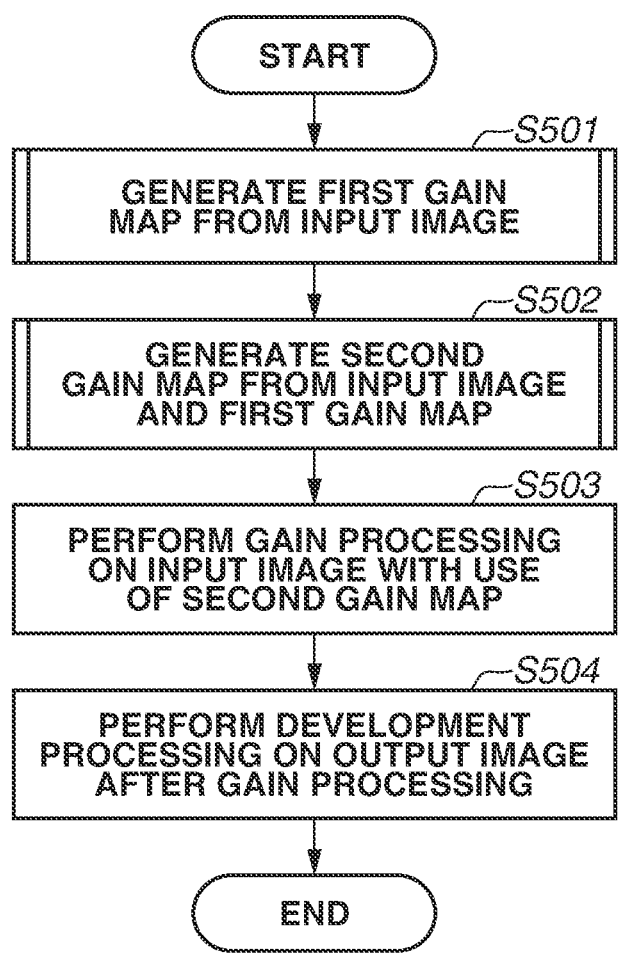
FIG. 5 is a flowchart illustrating a flow of processing by the image processing unit according to the first exemplary embodiment.

FIG. 5 is a flowchart illustrating, as an operation flow, the flow of the processing performed by each block in the image processing unit 104 of FIG. 2. The flow of the processing in the image processing unit 104 is described in detail below with reference to the flowchart of FIG. 5.

In step S501, processing to generate a first gain map from an input image is performed. The detail of contents of the processing to generate the first gain map is described below. In the present exemplary embodiment, the gain map refers to an image in which a gain to be applied is determined according to a position within the image as illustrated in FIG. 8B.

In step S502, processing to generate a second gain map based on the input image and the first gain map generated in step S501 is performed. Contents of the processing to generate the second gain map are also described below.

In step S503, processing to apply a gain to the input image with use of the second gain map generated in step S502 is performed. When a signal value at a coordinate (x, y) of the input image is denoted by in(x, y) and a value of the second gain map at the coordinate (x, y) is denoted by Gain(x, y), a signal value Out(x, y) of an output signal after gain processing is represented by Expression 1.

$$\text{out}(x,y) = \text{Gain}(x,y) \times \text{in}(x,y) \quad (1)$$

In step S504, development processing is performed on the image having been subjected to the gain processing in step S503. The development processing refers to processing such as noise reduction processing, edge emphasis processing, color matrix processing, and γ conversion processing.

The processing performed in the image processing unit 104 has been described above. Distinctive processing according to the present exemplary embodiment includes the processing from step S501 to step S503.

Next, the processing in step S501 and step S502 is described in detail.

First, the processing to generate the first gain map in step S501 is described.

Figure 3:
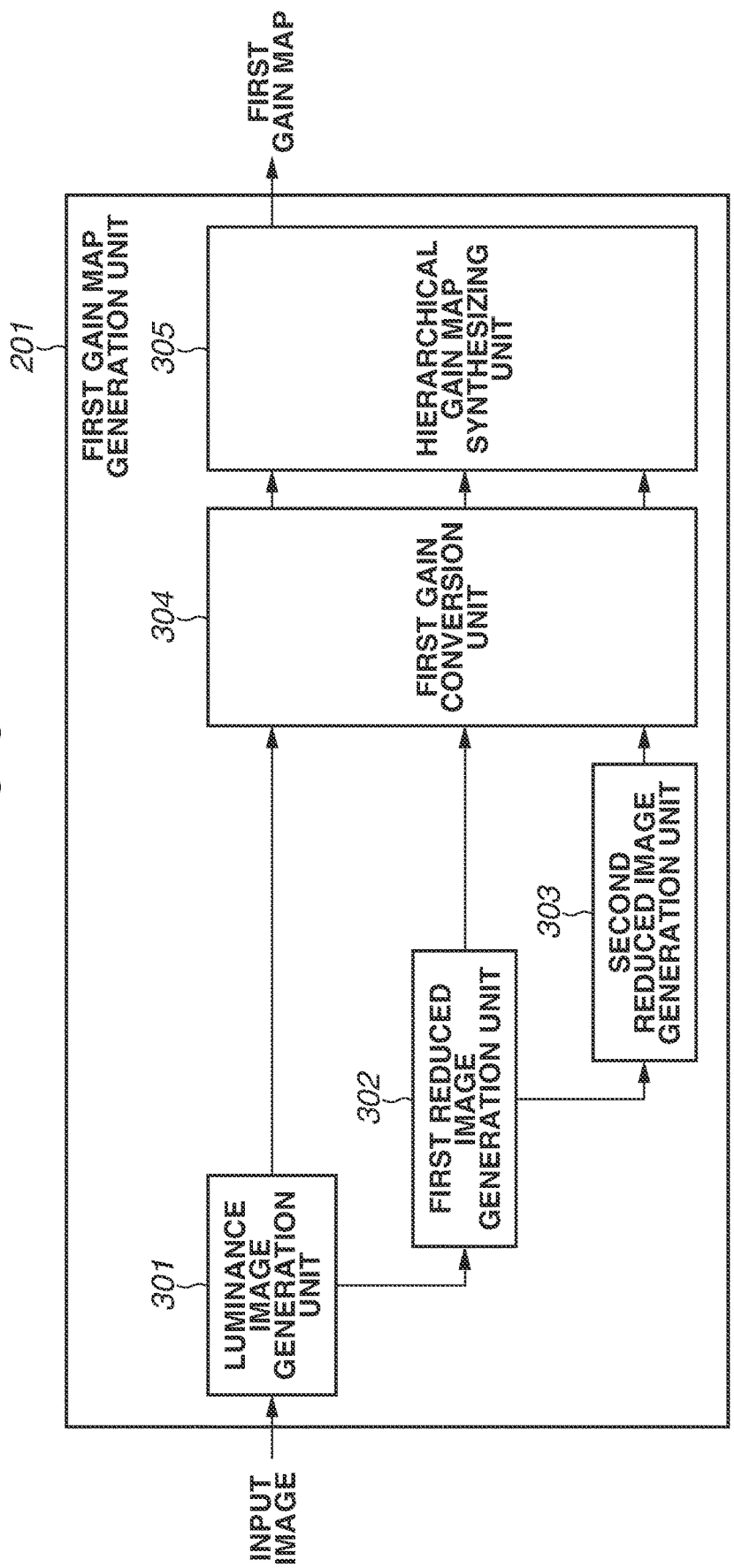
FIG. 3 is a block diagram illustrating a configuration of a first gain map generation unit according to the first exemplary embodiment.

FIG. 3 is a block diagram illustrating a configuration of the first gain map generation unit 201 corresponding to the processing in step S501. The first gain map generation unit 201 includes a luminance image generation unit 301, a first reduced image generation unit 302, a second reduced image generation unit 303, a first gain conversion unit 304, and a hierarchical gain map synthesizing unit 305.

Figure 6:
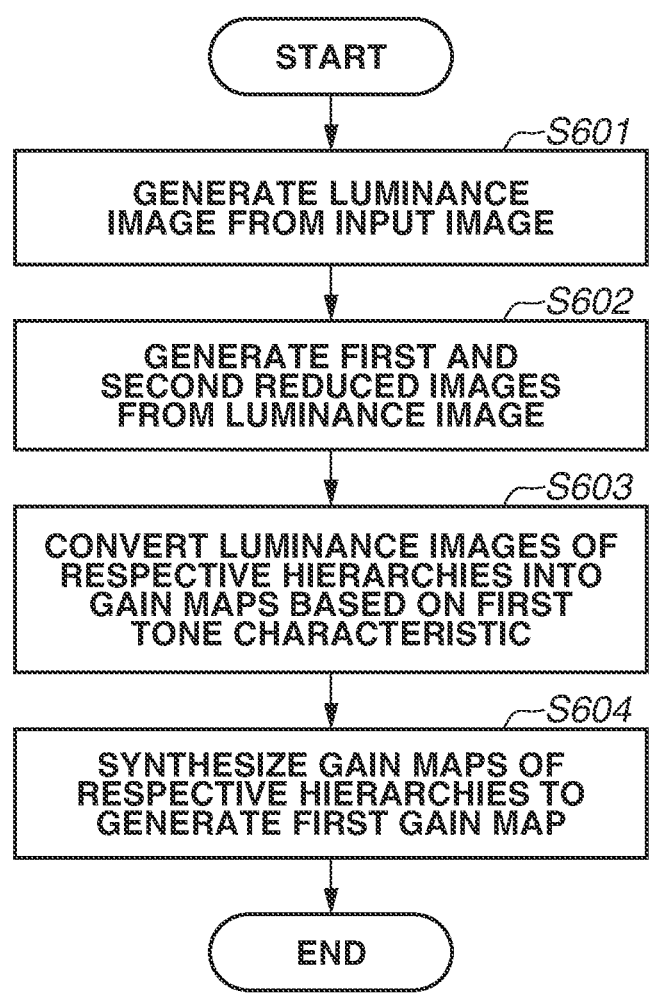
FIG. 6 is a flowchart illustrating processing by the first gain map generation unit according to the first exemplary embodiment.

FIG. 6 is a flowchart illustrating, as an operation flow, the flow of the processing performed by each block in the first gain map generation unit 201. The processing to generate the first gain map is described in detail below with reference to the flowchart of FIG. 6.

In step S601, processing to generate a luminance image from the input image is performed. To generate a signal value of the luminance image, for example, a method for generating a luminance signal Y from image signals of RGB with use of Expression 2 may be used.

$$Y = 0.299R + 0.587G + 0.114B \quad (2)$$

In step S602, reduction processing is stepwisely performed on the luminance image generated in step S601 to generate a first reduced image and a second reduced image. The first reduced image and the second reduced image are different in image size from each other, and the second reduced image is an image created by further performing the reduction processing on the first reduced image. As a method for the reduction processing, for example, a reduction method using a bilinear method may be used. Accordingly, in step S602, a hierarchical image including a plurality of images different in frequency band from one another is generated based on the input image.

In step S603, a first tone characteristic is applied to the luminance image generated in step S601 and to the first reduced image and the second reduced image generated in step S602 to generate corresponding gain maps.

Figure 8A:
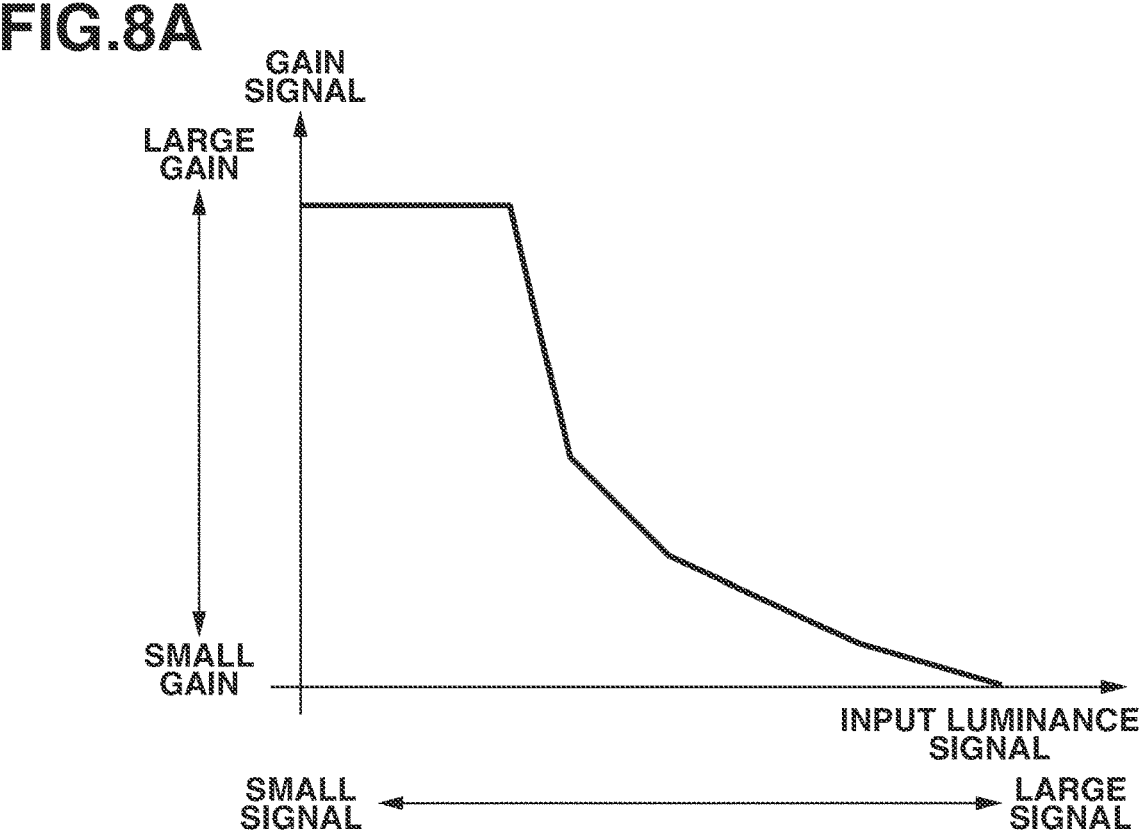
FIGS. 8A and 8B are a graph and a diagram, respectively, illustrating a relationship between a tone characteristic and a gain map.
Figure 8B:
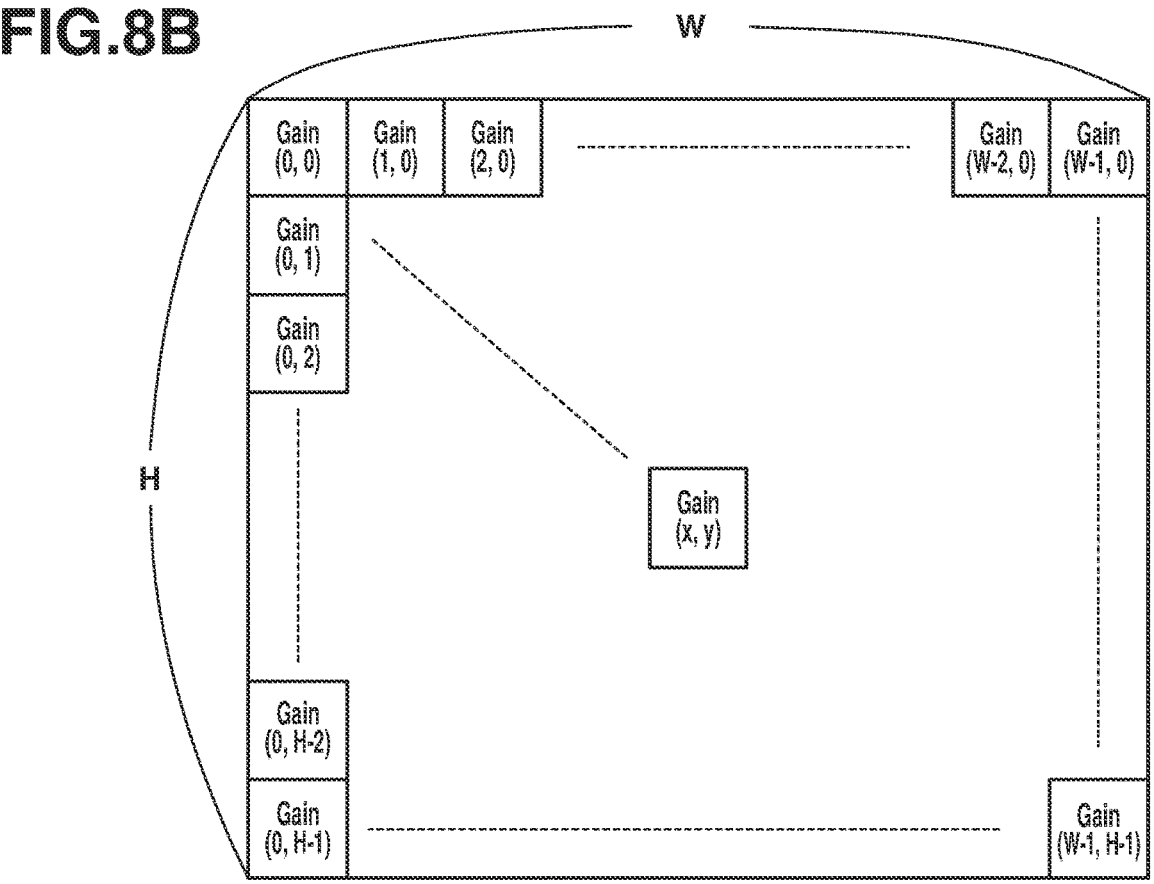

The first tone characteristic refers to a gain table in which a horizontal axis indicates an input luminance signal and a vertical axis indicates a gain signal as illustrated in FIG. 8A. The gain table (i.e., graph) may have any shape. In the present exemplary embodiment, as illustrated in FIG. 8A, the gain table has a shape in which the gain signal is large when the input luminance signal is small, and the gain signal becomes smaller as the signal value of the input luminance signal becomes larger. The first tone characteristic is applied to the luminance image to generate a gain map including a gain signal corresponding to a pixel position as illustrated in FIG. 8B.

In step S604, the gain map generated from the luminance image, the gain map generated from the first reduced image, and the gain map generated from the second reduced image in step S603 are synthesized to generate the first gain map.

To synthesize the gain maps, a method for weightedly adding the gain signal of the gain map larger in image size and the gain signal of the gain map smaller in image size according to a gain signal difference may be used.

The above is the description of the contents of the processing to generate the first gain map in step S501.

Next, the processing to generate the second gain map in step S502 is described.

Figure 4:
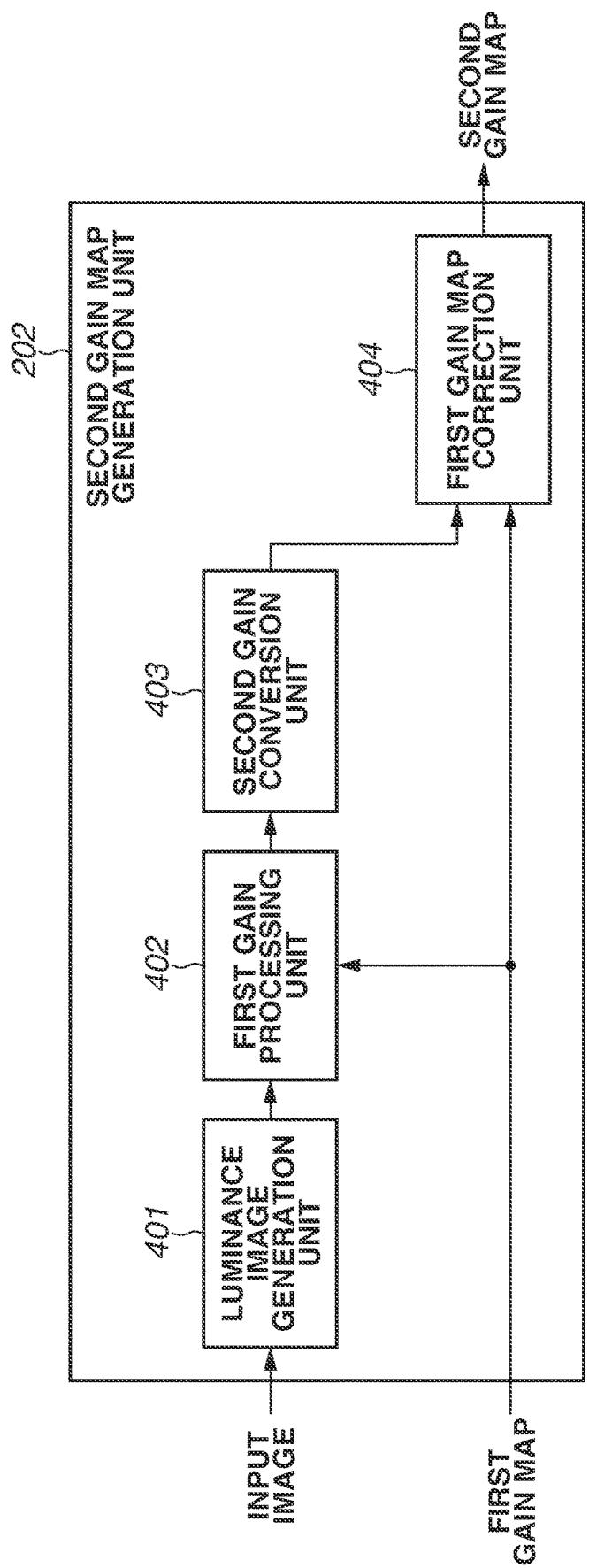
FIG. 4 is a block diagram illustrating a configuration of a second gain map generation unit according to the first exemplary embodiment.

FIG. 4 is a block diagram illustrating a configuration of the second gain map generation unit 202 corresponding to the processing in step S502. The second gain map generation unit 202 includes a luminance image generation unit 401, a first gain processing unit 402, a second gain conversion unit 403, and a first gain map correction unit 404.

Figure 7:
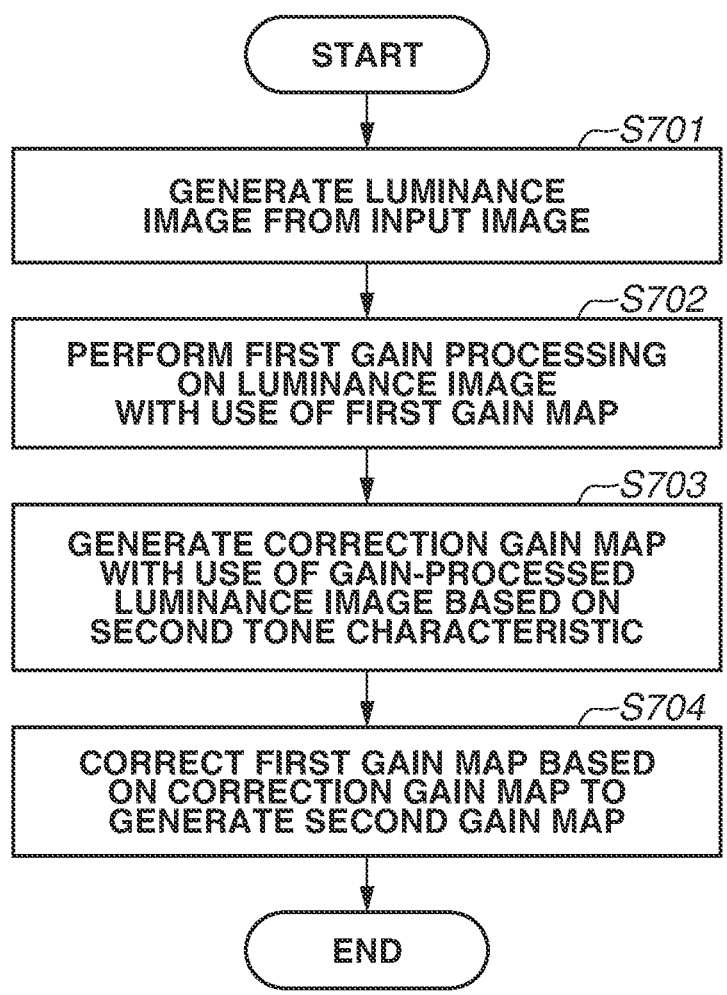
FIG. 7 is a flowchart illustrating processing by the second gain map generation unit according to the first exemplary embodiment.

FIG. 7 is a flowchart illustrating, as an operation flow, the flow of the processing performed by each block in the second gain map generation unit 202 of FIG. 4. The processing to generate the second gain map is described in detail below with reference to the flowchart of FIG. 7.

In step S701, the luminance image is generated from the input image. The method for generating the luminance image is similar to the above-described processing in step S601, and a description thereof is therefore omitted.

In step S702, first gain processing is performed on the luminance image generated in step S701 with use of the first gain map generated in step S501 described above. When the signal value at the coordinate (x, y) of the input image is denoted by in(x, y) and a value of the first gain map at the coordinate (x, y) is denoted by Gain_1(x, y), a signal value Out(x, y) of an output signal after the first gain processing is represented by Expression 3.

$$\text{out}(x,y) = \text{Gain\_1}(x,y) \times \text{in}(x,y) \quad (3)$$

In step S703, a correction gain map is generated from the second tone characteristic based on the luminance image subjected to the first gain processing in step S702 described above.

Figure 9A:
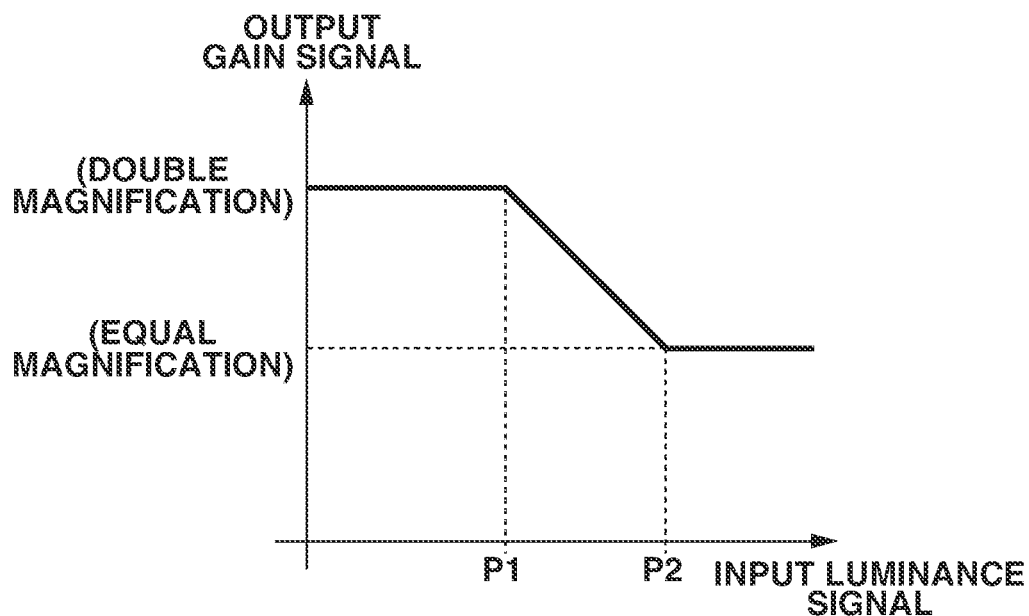
FIGS. 9A and 9B are graphs respectively illustrating a first tone characteristic and a second tone characteristic according to the first exemplary embodiment.
Figure 9B:
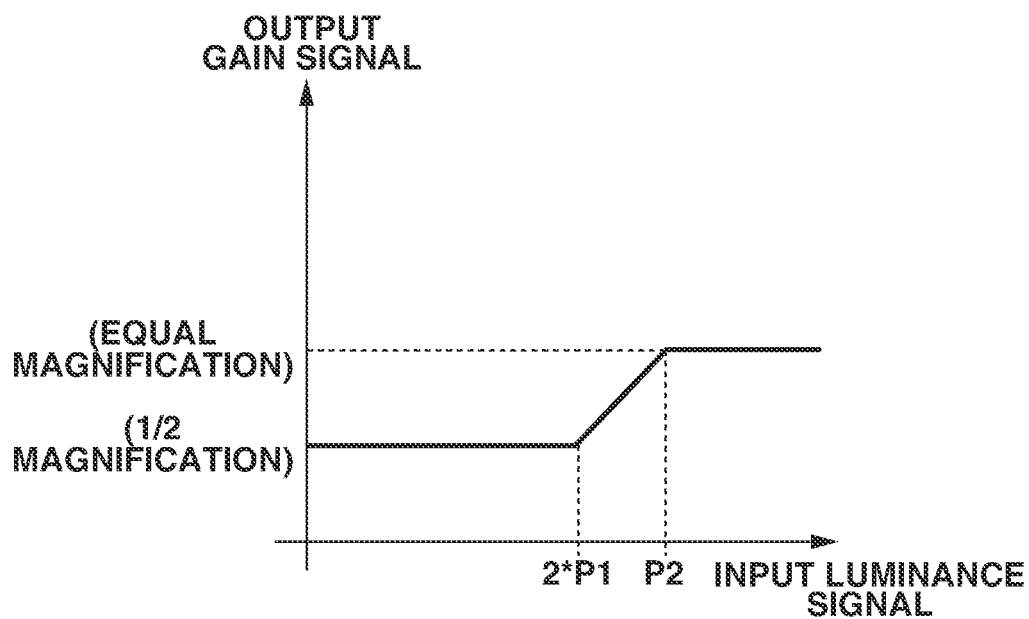

The second tone characteristic is described with reference to FIGS. 9A and 9B.

The second tone characteristic refers to a gain table as with the first tone characteristic, and has a characteristic of cancelling a tone conversion by the first tone characteristic described above. FIG. 9A illustrates an example of the first tone characteristic, and FIG. 9B illustrates an example of the second tone characteristic. The first tone characteristic has a characteristic in which a gain is double magnification until a signal value P1 of the input luminance signal, and the gain becomes equal magnification as a signal value of the input luminance signal approaches a signal value P2. The second tone characteristic has a characteristic of cancelling the applied gain by the first gain characteristic of the first tone characteristic.

More specifically, the signal value P1 to which the gain of double magnification has been applied by the first tone characteristic becomes a signal value 2×P1. Therefore, by the second tone characteristic, a gain of ½ magnification is applied up to the input luminance signal having the signal value 2×P1. Further, the signal value P2 to which the gain of equal magnification has been applied by the first tone characteristic is not changed. Therefore, also by the second tone characteristic, the gain of equal magnification is applied to the input luminance signal having the signal value P2.

As the method for generating the gain map from the second tone characteristic, the conversion method using the gain table is used as with step S603 described above. The luminance image subjected to the first gain processing in step S702 described above is used as an input and is converted into a gain signal with use of the gain table, and the gain signal is output as the correction gain map. Accordingly, the correction gain map generation is performed in step S703.

Step S704 is described with reference to FIG. 7 again.

In step S704, the first gain map generated in step S501 described above is corrected based on the correction gain map generated in step S703 described above to generate the second gain map. The second gain map is generated by applying the gain signal of the correction gain map to the gain signal of the first gain map as represented by Expression 4. When the value of the first gain map at the coordinate (x, y) is denoted by Gain_1(x, y) and a value of the correction gain map at the coordinate (x, y) is denoted by hGain(x, y), a value of the second gain map becomes Gain(x, y).

$$\text{Gain}(x,y) = \text{Gain\_1}(x,y) \times h\text{Gain}(x,y) \quad (4)$$

The above is the description of the contents of the processing to generate the second gain map in step S502.

Finally, a contrast improvement effect according to the present exemplary embodiment described above is described with reference to FIGS. 10A to 10D. In each of graphs of FIGS. 10A to 10D, a horizontal axis indicates a coordinate in an x direction, and a vertical axis indicates a value of the luminance signal and a value of the gain signal.

First, an effect in a high-frequency region where the luminance signal is varied is described.

FIG. 10A is a graph to describe an effect of the gain processing with use of the first gain map in the high-frequency region where the luminance signal is varied.

When the first tone characteristic is directly applied to an input luminance signal 1001, a gain signal 1002 having a characteristic in which the gain is sensitively varied according to a value of the input luminance signal 1001 is obtained. When the gain signal 1002 is directly applied to the input luminance signal 1001, a luminance signal after the gain processing becomes a luminance signal 1003, and contrast of the luminance signal is deteriorated.

Accordingly, the first gain map is generated with use of the reduced image of the input image, which results in a gain signal 1004 having a characteristic in which the gain is insensitively varied relative to the value of the input luminance signal 1001. The contrast of the luminance signal after the gain processing is maintained as variation of the gain becomes more insensitive, and the luminance signal after the gain processing becomes a luminance signal 1005. The effect of the gain processing with use of the correction gain map is further described below.

FIG. 10B is a graph to describe the effect of the gain processing with use of the correction gain map in the high-frequency region where the luminance signal is changed.

The correction gain map is generated by directly applying the second tone characteristic, which has a characteristic of cancelling the first tone characteristic, without using the reduced image as with the first gain map. Accordingly, the gain signal of the correction gain map becomes a gain signal 1006 having a characteristic of returning the gain signal 1002 when the first tone characteristic is directly applied to the gain signal of equal magnification.

The first gain map, however, has the tone characteristic insensitive to the luminance signal as with the gain signal 1004 because of the use of the reduced image, and the luminance signal subjected to the gain processing with use of the first gain map becomes the luminance signal 1005. Accordingly, the luminance signal subjected to the gain processing with use of the correction gain map becomes a luminance signal 1007 that has contrast higher than that of the input luminance signal 1001. Accordingly, in the high-frequency region where the luminance signal is varied, performing the tone processing according to the present exemplary embodiment makes it possible to enhance the contrast. In the present exemplary embodiment, the effects of the first gain map and the correction gain map described in FIGS. 10A and 10B are achieved by performing the gain processing using one gain map, which is the second gain map.

Next, an effect achieved by the present exemplary embodiment in a low-frequency region where the luminance signal is hardly varied is described.

FIG. 10C is a graph illustrating an effect of the gain processing with use of the first gain map in the low-frequency region where the luminance signal is hardly varied.

Unlike the high-frequency region where the luminance signal is varied, sensitivity of a gain signal 1010 obtained by directly applying the first tone characteristic to an input luminance signal 1009 and sensitivity of a gain signal 1012 of the first gain map generated with use of the reduced image of the input image are little different from each other. Therefore, luminance signals after the gain processing become luminance signals 1011 and 1013, and the contrasts of which are little different from each other. This is because there is substantially no difference in luminance distribution between the reduced image of the input image and the equal magnification image because of the low-frequency region where the luminance signals are hardly varied. The effect of the gain processing with the correction gain map is described more below.

FIG. 10D is a graph illustrating an effect of the gain processing with use of the correction gain map in the low-frequency region where the luminance signal is hardly varied.

The above-described gain signal of the first gain map is little different from the gain signal obtained by directly applying the first tone characteristic to the input luminance signal. Therefore, a luminance signal subjected to the gain processing with a gain signal 1014 by the second tone characteristic, which has a characteristic of canceling the first tone characteristic, becomes a luminance signal 1015, which is little different from an input luminance signal 1016. In other words, in the low-frequency region where the luminance signal is hardly varied, an effect that brightness is not changed even when the tone processing according to the present exemplary embodiment is performed is obtained.

Performing the processing according to the present exemplary embodiment in the above-described manner makes it possible to achieve the contrast improvement effect of improving the contrast only in the high-frequency region where the luminance signal is varied and not changing brightness in the low-frequency region where the luminance signal is hardly varied.

Next, a second exemplary embodiment is described.

The present exemplary embodiment is characterized in that the first gain map is not used in generating the correction gain map. Any other processing is similar to that in the first exemplary embodiment.

Hereinafter, a description of the present exemplary embodiment is mainly given of a configuration different from that in the first exemplary embodiment. The configurations of the imaging apparatus and the image processing unit 104 and the processing contents of the first gain map generation unit 201, the gain processing unit 203, and the development processing unit 204 are similar to those in the first exemplary embodiment, and a description thereof is therefore omitted.

Next, a configuration of a second gain map generation unit 202 is described with reference to FIG. 11. The second gain map generation unit 202 includes a luminance image generation unit 1101, a second gain conversion unit 1102, and a first gain map correction unit 1103.

Figure 11:
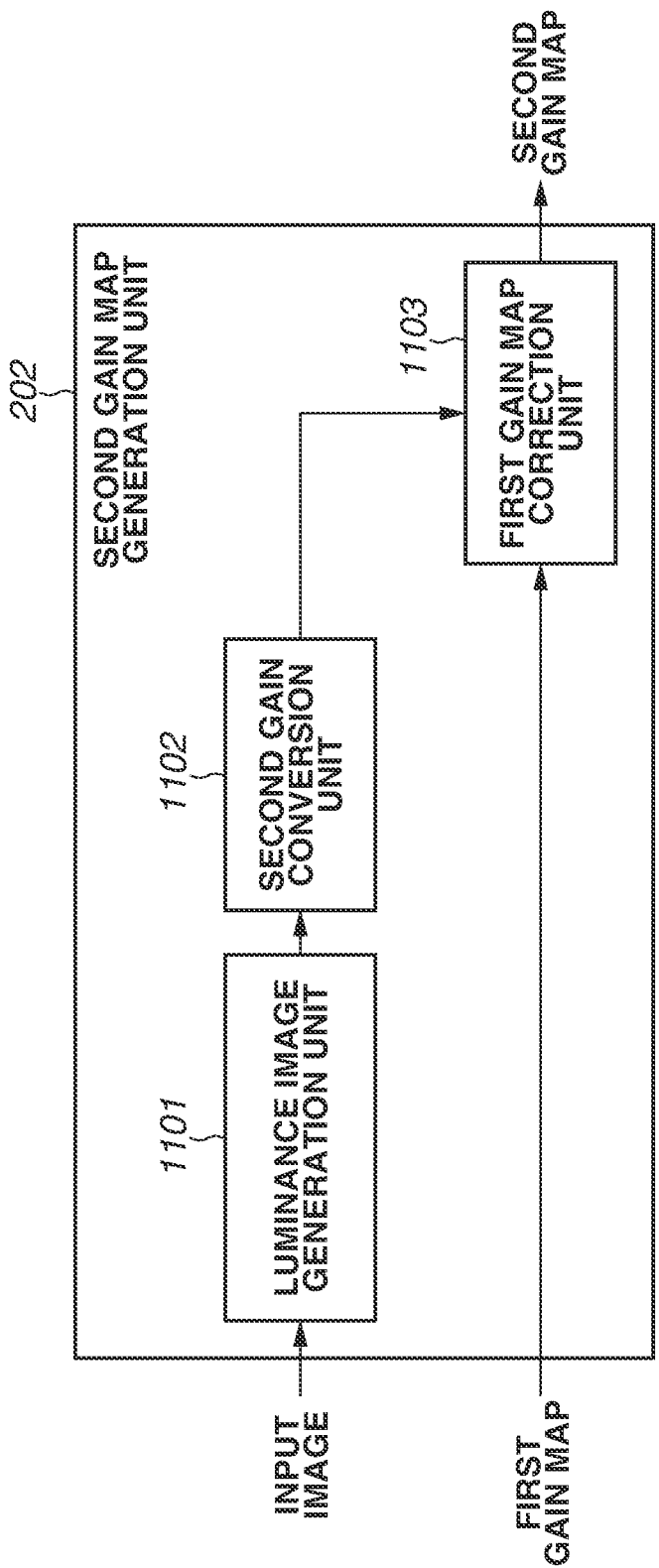
FIG. 11 is a block diagram illustrating a configuration of a second gain map generation unit according to a second exemplary embodiment.
Figure 12:
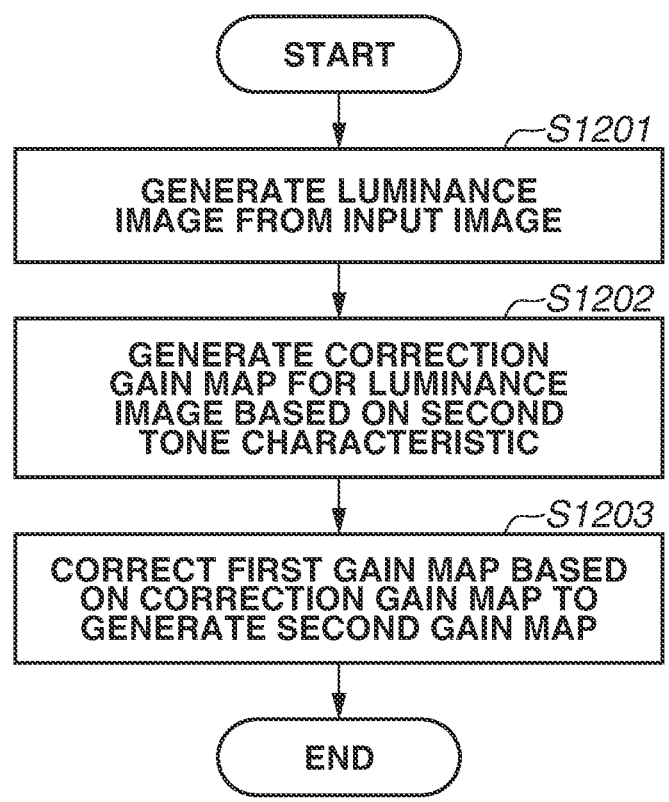
FIG. 12 is a flowchart illustrating processing by the second gain map generation unit according to the second exemplary embodiment.

FIG. 12 is a flowchart illustrating, as an operation flow, the flow of the processing performed by each block in the second gain map generation unit 202 of FIG. 11. The second gain map generation processing is described in detail below with reference to the flowchart of FIG. 12.

In step S1201, processing to generate a luminance image from an input image is performed. The method for generating the luminance image is similar to the method in step S601 according to the first exemplary embodiment, and a description thereof is therefore omitted.

In step S1202, a correction gain map for the luminance image generated in step S1201 described above is generated with use of the second tone characteristic, which has a characteristic of canceling tone conversion by the first tone characteristic. The second tone characteristic is described with reference to FIGS. 13A and 13B. The present exemplary embodiment is different from the first exemplary embodiment in that a horizontal axis of the second tone characteristic indicates not the luminance signal after application of the first tone characteristic but the luminance signal of the input image.

Figure 13A:
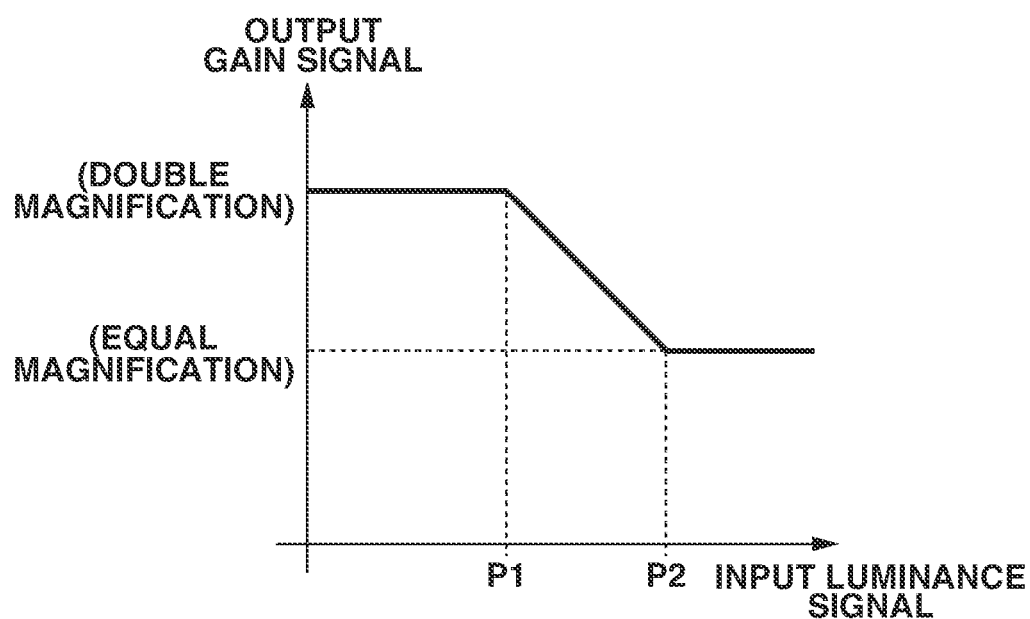
FIGS. 13A and 13B are graphs respectively illustrating a first tone characteristic and a second tone characteristic according to the second exemplary embodiment.
Figure 13B:
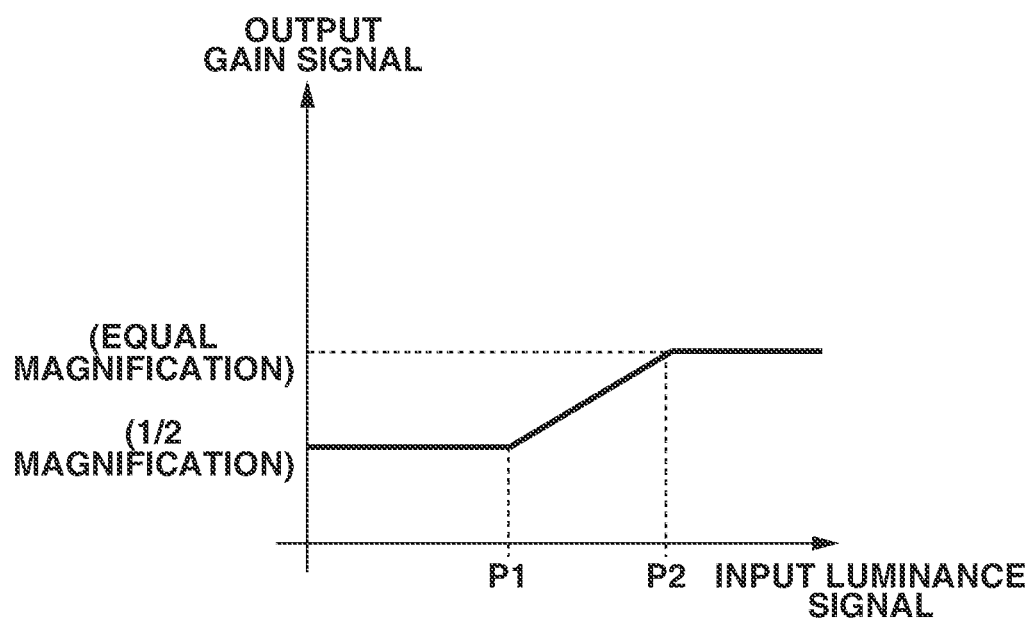

The first tone characteristic of FIG. 13A is similar to that in the first exemplary embodiment; however, the second tone characteristic of FIG. 13B is different from that in the first exemplary embodiment, and an input luminance signal in the horizontal axis corresponding to the gain signal for canceling the gain signal of the first tone characteristic is changed. The luminance signal at which the gain signal of the first tone characteristic is changed in the horizontal axis is similar to that in the first tone characteristic.

In step S1203, the first gain map is corrected with use of the correction gain map generated in step S1202 described above to generate the second gain map. The method for generating the second gain map is similar to the processing in step S704 according to the first exemplary embodiment, and a description thereof is therefore omitted.

The above is the description of the contents of the processing by the second gain map generation unit 202 according to the present exemplary embodiment.

Next, a third exemplary embodiment is described.

The present exemplary embodiment is characterized in that the first gain processing is performed on an input image with use of the first gain map, and then second gain processing is performed thereon with use of the second gain map. The first gain map generation processing is similar to that in the first exemplary embodiment, and the second gain map refers to the correction gain map in the first exemplary embodiment.

Hereinafter, a description of the present exemplary embodiment is given mainly for a configuration different from that in the first exemplary embodiment.

The configuration of the imaging apparatus according to the present exemplary embodiment is similar to that in the first exemplary embodiment, and a description thereof is therefore omitted.

Next, the configuration of the image processing unit 104 is described with reference to FIG. 14. The image processing unit 104 includes a first gain map generation unit 1401, a first gain processing unit 1402, a second gain map generation unit 1403, a second gain processing unit 1404, and a development processing unit 1405. The first gain map generation unit 1401 and the development processing unit 1405 are similar to those in the first exemplary embodiment.

Figure 14:
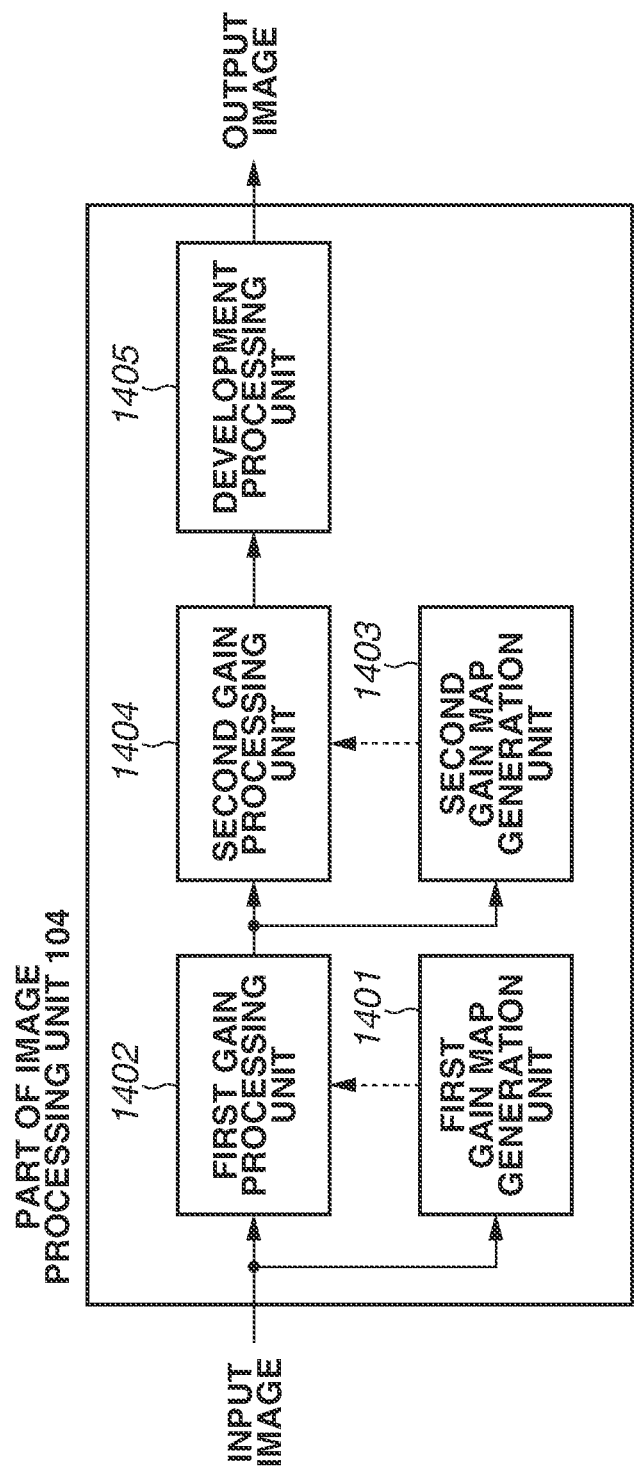
FIG. 14 is a block diagram illustrating a configuration of an image processing unit according to a third exemplary embodiment.

FIG. 16 is a flowchart illustrating, as an operation flow, the flow of the processing performed by each block in the image processing unit 104 of FIG. 14. The processing by the blocks in the image processing unit 104 is described in detail below with reference to the flowchart of FIG. 16.

In step S1601, processing to generate the first gain map from an input image is performed. The method for generating the first gain map is similar to the method in step S501 according to the first exemplary embodiment, and a description thereof is therefore omitted.

In step S1602, the first gain processing is performed on the input image with use of the first gain map generated in step S1601 described above. The gain processing method is similar to the method in step S702 according to the first exemplary embodiment, and a description thereof is therefore omitted.

In step S1603, the second gain map is generated based on the image subjected to the first gain processing in step S1602 described above. The method for generating the second gain map is described in detail below.

In step S1604, the second gain processing is performed on the image subjected to the first gain processing in step S1602 described above with use of the second gain map generated in step S1603 described above. The second gain processing method is similar to the method in step S503 according to the first exemplary embodiment, and a description thereof is therefore omitted.

In step S1605, the development processing is performed on the image subjected to the second gain processing in step S1604 described above. The contents of the development processing are similar to those in step S504 according to the first exemplary embodiment.

The above is the description of the processing in the image processing unit 104 according to the present exemplary embodiment.

Next, the processing to generate the second gain map in step S1603 is described.

Figure 15:
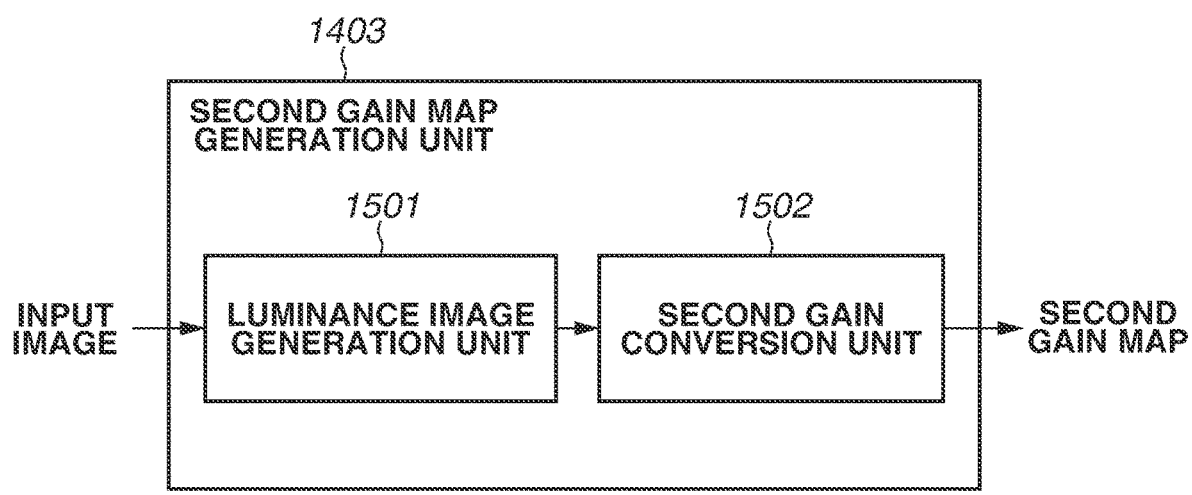
FIG. 15 is a block diagram illustrating a configuration of a second gain map generation unit according to the third exemplary embodiment.
Figure 18A:
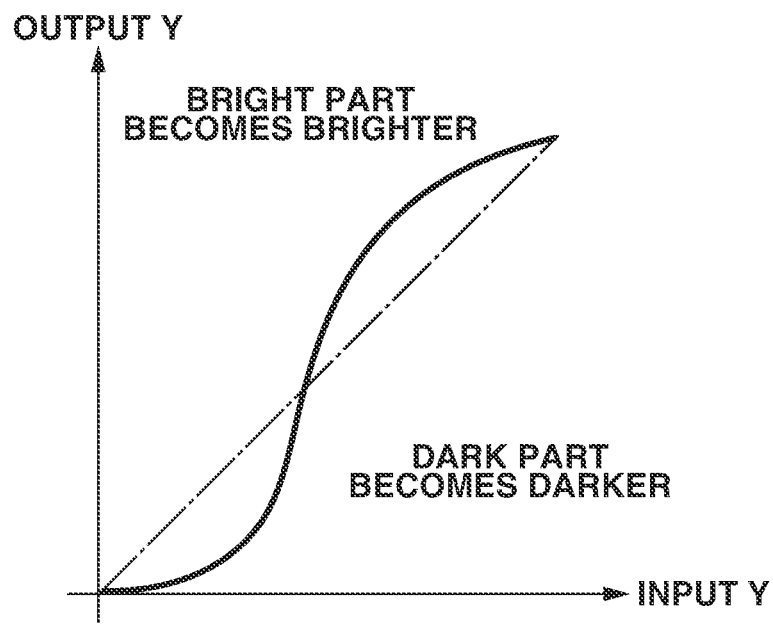
FIGS. 18A and 18B are graphs illustrating an issue of a contrast correction using an S-curve as an existing technique.
Figure 18B:
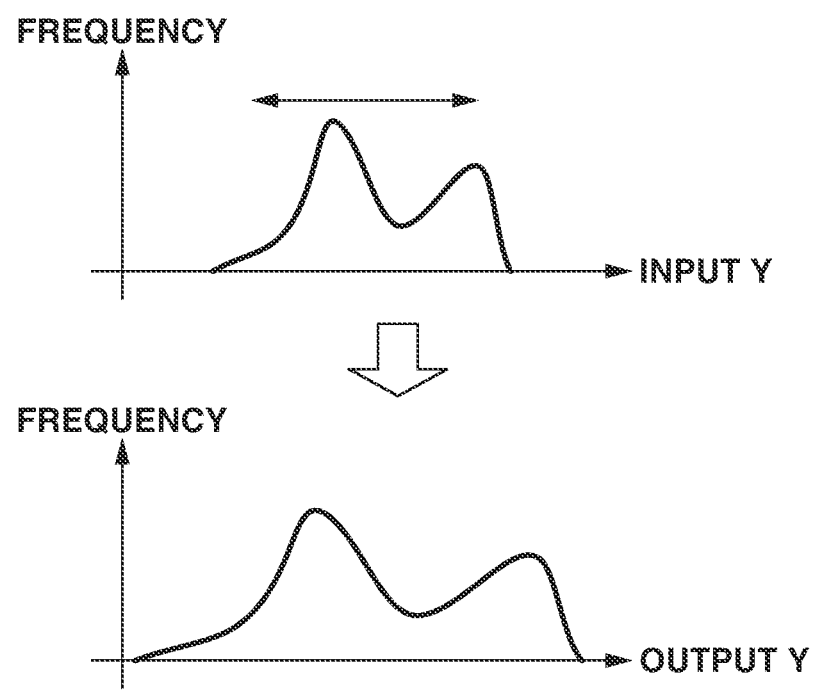

FIG. 15 is a block diagram illustrating a configuration of the second gain map generation unit 1403 corresponding to the process in step S1603. The second gain map generation unit 1403 includes a luminance image generation unit 1501 and a second gain conversion unit 1502.

FIG. 17 is a flowchart illustrating, as an operation flow, the flow of the processing performed by each block in the second gain map generation unit 1403 of FIG. 15. The processing by the blocks in the second gain map generation unit 1403 is described in detail below with reference to the flowchart of FIG. 17.

In step S1701, processing to generate the luminance image from the image subjected to the first gain processing is performed. The method for generating the luminance image is similar to the method in step S601 according to the first exemplary embodiment, and a description thereof is therefore omitted.

In step S1702, the second gain map is generated from the luminance image generated in step S1701 described above with use of the second tone characteristic. The method for generating the second gain map is similar to the method for generating the correction gain map in step S703 according to the first exemplary embodiment, and a description thereof is therefore omitted.

All the descriptions of the processing to generate the second gain map in step S1603 according to the present exemplary embodiment are completed.

The embodiments of the disclosure may be configured such that software (program) achieving the functions of the above-described exemplary embodiments is supplied to a system or an apparatus through a network or various kinds of storage media, and a computer (or central processing unit (CPU), microprocessor unit (MPU), etc.) of the system or the apparatus reads and executes codes of the program. In this case, the program and the storage media storing the program constitute the aspect of the embodiments.

Although the exemplary embodiments of the disclosure have been described above, the disclosure is not limited to these exemplary embodiments, and various modifications and alternations may be made within the scope of the disclosure.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-144401, filed Jul. 26, 2017, which is hereby incorporated by reference herein in its entirety.

What is claimed is:

1. An apparatus comprising:
   an image generation unit configured to generate, from an input image, a hierarchical image including a plurality of images different in frequency band from one another;
   a first gain map generation unit configured to generate a first gain map with use of the hierarchical image and a first tone characteristic;
   a correction gain map generation unit configured to generate a correction gain map based on the first gain map and a second tone characteristic;
   a second gain map generation unit configured to correct the first gain map with use of the correction gain map to generate a second gain map; and
   a processing unit configured to apply the second gain map to the input image,
   wherein the second tone characteristic has a characteristic of cancelling tone conversion by the first tone characteristic with a signal value after application of the first tone characteristic to the input image as a horizontal axis.

2. The apparatus according to claim 1, wherein the first and second gain map indicate a gain to be applied according to a position within the image.

3. A method comprising:
   generating, from an input image, a hierarchical image including a plurality of images different in frequency band from one another;
   generating a first gain map with use of the hierarchical image and a first tone characteristic;
   generating a correction gain map based on the first gain map and a second tone characteristic;
   correcting the first gain map with use of the correction gain map to generate a second gain map; and
   applying the second gain map to the input image,
   wherein the second tone characteristic has a characteristic of cancelling tone conversion by the first tone characteristic with a signal value after application of the first tone characteristic to the input image as a horizontal axis.

4. The method according to claim 3, wherein the first and second gain map indicate a gain to be applied according to a position within the image.

5. A non-transitory computer readable storage medium storing a computer-executable program of instructions for causing a computer to perform a method comprising:
   generating, from an input image, a hierarchical image including a plurality of images different in frequency band from one another;
   generating a first gain map with use of the hierarchical image and a first tone characteristic;
   generating a correction gain map based on the first gain map and a second tone characteristic;
   correcting the first gain map with use of the correction gain map to generate a second gain map; and
   applying the second gain map to the input image,
   wherein the second tone characteristic has a characteristic of cancelling tone conversion by the first tone characteristic with a signal value after application of the first tone characteristic to the input image as a horizontal axis.

6. The non-transitory computer readable storage medium according to claim 5, wherein the first and second gain map indicate a gain to be applied according to a position within the image.

* * * * *